United States Patent
Johnson et al.

(10) Patent No.: US 7,297,279 B2
(45) Date of Patent: Nov. 20, 2007

(54) METHOD FOR REMOVING OIL FROM WATER COALESCING IN A POLYMER PARTICLE/FIBER MEDIA

(75) Inventors: Michael R. Johnson, Mandeville, LA (US); John Occhipinti, Katy, TX (US); Jerald W. Darlington, Jr., Marengo, IL (US)

(73) Assignee: AMCOL International Corporation, Arlington Heights, IL (US)

( * ) Notice: Subject to any disclaimer, the term of this patent is extended or adjusted under 35 U.S.C. 154(b) by 465 days.

(21) Appl. No.: 11/042,973

(22) Filed: Jan. 21, 2005

(65) Prior Publication Data

US 2006/0163177 A1 Jul. 27, 2006

(51) Int. Cl.
B01D 17/02 (2006.01)
C02F 1/28 (2006.01)

(52) U.S. Cl. .................. 210/669; 210/693; 210/804; 210/DIG. 5

(58) Field of Classification Search ................ 210/660, 210/663, 669, 671, 680, 690–694, 799, 800, 210/804, 263, 265, 291, 505, 484, 924, DIG. 5
See application file for complete search history.

(56) References Cited

U.S. PATENT DOCUMENTS

| | | | | |
|---|---|---|---|---|
| 3,876,544 A | * | 4/1975 | Fowler .................... 210/198.1 |
| 4,123,354 A | * | 10/1978 | Williams .................... 210/671 |
| 4,173,533 A | * | 11/1979 | Williams .................... 210/747 |
| 4,892,667 A | * | 1/1990 | Parker et al. ............... 210/799 |
| 5,993,372 A | * | 11/1999 | Holland ..................... 588/255 |
| 6,332,987 B1 | * | 12/2001 | Whitney et al. ........... 210/799 |
| 6,398,951 B1 | | 6/2002 | Smith et al. |
| 6,398,966 B1 | | 6/2002 | Smith et al. |
| 6,409,924 B1 | | 6/2002 | Johnson et al. |
| 6,413,429 B1 | * | 7/2002 | Breman et al. ............. 210/634 |
| 6,533,941 B2 | * | 3/2003 | Butler ........................ 210/681 |
| 6,569,330 B1 | * | 5/2003 | Sprenger et al. ............ 210/315 |
| 2004/0112823 A1 | | 6/2004 | Benachenou et al. |

* cited by examiner

Primary Examiner—Frank M. Lawrence
(74) Attorney, Agent, or Firm—Marshall, Gerstein & Borun LLP

(57) ABSTRACT

Apparatus in fluid communication with a water leg portion of a hydrocarbon-contaminated water, e.g., a water leg portion of a produced water stream or an offshore drilling or production platform sump tank for conveying water, separated from oil, into contact with non-woven fiber/particulate polymer coalescing media-containing canisters such that the hydrocarbon droplets and other organic material droplets commingled with the sump tank or produced water will be coalesced by passage through the coalescing media. The canisters preferably are provided in a plurality of stacks in each vessel. Solids that do not pass through the canisters are accumulated at the bottom of the vessel and easily drained through a drain port. The water and hydrocarbons will pass through the coalescing media within the canisters and will be separated easily from each vessel, e.g., by gravity separation, sot that the water can be conveyed back to the ocean water without contamination.

12 Claims, 6 Drawing Sheets

METHOD FOR REMOVING OIL FROM WATER COALESCING IN A POLYMER PARTICLE/FIBER MEDIA

FIELD OF THE INVENTION

The present invention is directed to an apparatus and method for separating oil, hydrocarbons and other organic materials from water, particularly industrial waste waters, ship bilge pump waters, produced water, deck drainage and rainwater collected on offshore oil drilling and production platforms, by coalescing the oil via contact with a polymer particle/fiber media. More particularly, the present invention is directed to an apparatus and method that preferably includes relatively crude, gravity separation of oil from the water and then contacting the separated water, containing a small amount of hydrocarbons, such as oil and grease, with polymer particles that are carried by non-woven fibers, for uniform distribution of the polymer particles therethrough, to coalesce the hydrocarbon droplets and separate the coalesced hydrocarbons from the water. Further, the present invention is directed towards a vessel for housing a plurality of cartridges containing the polymer/non-woven fiber coalescing material.

BACKGROUND AND PRIOR ART

During the production of oil and gas from subterranean formations located thousands of feet below the sea floor, water is commingled with the oil and gas and brought to the surface facilities for treatment. The oil and gas must be separated from the aqueous phase prior to being transported to the inland refineries. This aqueous phase referred to as produced water must also be treated to remove all insoluble oil and grease such that when extracted with solvents comply with local regulations for discharge into the environment. These produced waters can range from 1% to 99% of total fluid during oil and gas production.

Produced water contains water-insoluble and marginally water-soluble petroleum oil components, generally in amounts of about 30 to about 2,000 parts per million, that are the subject of EPA regulations because of their toxicity and sheen causing potential on the surface of the ocean. The water insoluble and marginally water-soluble petroleum oil components may not be returned to the ocean in a concentration greater than 29 parts per million from an off-shore petroleum oil production facility because these materials have a tendency to separate from ocean water, due to the relatively low ocean water temperature, and agglomerate in the form of suspended droplets that result in a sheen on the surface of the ocean. Higher concentrations of organics also cause toxicity concerns for the indigenous species in the sea.

Offshore drilling and production platforms used for recovering oil from subterranean formations disposed beneath ocean water includes a number of structural support legs for supporting a plurality of work deck areas at substantial heights above the water level, e.g., disposed from 40 to 100 or more feet above sea level. During the recovery of oil at one or more of these work deck areas, oil, grease and other hydrocarbons are unavoidably spilled onto the deck area(s) and it is not permissible to discard these hydrocarbons into the ocean water. Such work deck areas or platform surfaces are constructed to be fluid-impermeable in order to contain the spilled hydrocarbons on the work deck areas. These hydrocarbons, such as recovered oil, grease, surfactants and other organic contaminants, are directed from the work deck or platform areas, either by water washing or rainwater, into a sump pump container or sump tank where the water and oil separate by gravity so that the water can be removed from a lower portion of the sump tank, for conveyance back to the ocean, and the oil can be pumped from an upper portion of the sump tank into an oil recovery container so that the oil is not returned to the ocean.

These contained deck areas on offshore structures collect a significant amount of water during periods of high rainfall. The rainwater and entrained hydrocarbons, particularly recovered oil, grease and surfactants, are conveyed to the sump tank or collection tank through a gravity drain system from each of the work deck areas. These sump tanks rely on retention time as the primary oil/water separation mechanism in order to skim the lighter density hydrocarbons from a top of the sump tank so that the water can be returned to the ocean.

The sump tanks presently used on offshore platforms suffer from a number of major drawbacks which result in significant amounts of hydrocarbons, particularly oil, paraffins, grease, and refined hydrocarbons being returned to the ocean causing significant ecological contamination. One major drawback of the presently used sump tanks is that they are designed for a maximum of about three inches of rainwater per hour. It has been found that it is not uncommon to experience eight to ten inches of rainfall per hour in areas such as the Gulf of Mexico. Another major drawback of the sump tanks presently used on offshore drilling platforms is that a tank containing a layer of oil disposed above a layer of water will lose the water by evaporation over an extended dry period and the oil layer, as a result, will coat the inside surfaces of the sump tank. This phenomena is known in the art as sheening. As a result of the sump tank sheening, water generated from even a modest rain shower, after this drying period, carries the oil through a water leg or drain portion of the sump tank as the water initially washes lower inner surfaces of the sump tank, thereby carrying the oil to the ocean.

Another water treatment problem associated with offshore oil and gas producing platforms is the treatment of the aqueous solutions used in acid fracturing processes. Specifically, acidic solutions are commonly pumped down under pressure to cause fractures in the oil producing regions of the formation. As these acidic solutions are returned to the surface, they are often contaminated with oil or hydrocarbons. As discussed above with respect to produced water and rainwater, the hydrocarbons must be removed from the solutions before the water is returned to the ocean.

Another problem associated with all auxiliary equipment used on oil platforms is the need for equipment to be designed in a space efficient manner. Specifically, auxiliary equipment, including water treatment equipment, must be designed in as space efficient manner as possible because horizontal square footage on an oil platform is scarce. Therefore, there is a need for water treatment equipment that can treat water at a fast rate, but which is also space efficient.

Organophilic clay has been used to absorb oil, as described in this assignees U.S. Pat. Nos. 6,398,951; 6,398, 966; and 6,409,924. Further, published application US 2004/0112823 A1 describes a process for breaking aqueous hydrocarbon emulsions by contact with a polymeric foam material that absorbs oil and, after the polymer foam is saturated with oil, the polymer releases as much oil as it absorbs, but in larger, coalesced droplets.

SUMMARY

The apparatus and methods described herein include apparatus for efficient contact of hydrocarbon-contaminated water with absorbent polymer particles carried by a fibrous carrier that permits relatively high liquid flow rates therethrough, and provides spacing of the polymer particles to provide maximum contact between the polymer particles and the hydrocarbon contaminant contained in the water for efficient coalescence of the hydrocarbons.

In accordance with one embodiment of the method, apparatus and polymer/non-woven fiber coalescing media described herein, an improved method and apparatus are provided for separating hydrocarbons from a liquid containing water and hydrocarbons, particularly an emulsion or stable dispersion of hydrocarbons and water. The apparatus includes an improved vessel that includes an inlet for conveying hydrocarbons, dispersed or emulsified in water, into the vessel and outlets for transporting separated water out of the vessel through the lower outlet, and coalesced hydrocarbons out of the vessel through the upper outlet. In the preferred embodiment, a removable header is connected to the upper or lower outlet and housed within the vessel. Permeable conduits are connected to the header and extend upward therefrom. Cartridges or canisters containing polymer particles homogeneously held throughout a fibrous particle capture and spacing media for coalescing hydrocarbon droplets are then stacked on the permeable conduits. Each cartridge includes a permeable outer cover and a permeable inner tube with the fibrous/polymeric particle capture media disposed therebetween. A pressure drop is provided between the vessel inlet and the vessel outlets, and therefore between the vessel inlet and the permeable conduits. As a result, the contaminated liquid flows radially outwardly through the inner tube of the cartridges, through the media and through the outer cover of the cartridge before flowing into the vessel. Intimate contact between the media and the contaminated liquid results in coalescence of the hydrocarbon contaminants. As the hydrocarbons coalesce and form larger oil droplets, the oil separates from the water in accordance with Stokes Law. The larger the coalesced oil droplets, the faster it separates from the aqueous phase. In the preferred embodiment, a header is detachably connected to the treated liquid outlet thereby facilitating removal of the header for replacement or servicing. Accumulated solids, which do not pass through the cartridges, are conveniently collected at the bottom of the vessel and can be flushed out through a drain valve.

In accordance with another aspect of the methods, apparatus and non-woven/polymeric particle coalescing media described herein, a final oil separation method and apparatus separates oil from water obtained from an oil and gas producing formation so that the water can be legally discarded, e.g., back into the ocean, or otherwise.

In accordance with a preferred embodiment, the preferred media is a polyurethane particulate solid polymer that is homogenously dispersed throughout a non-woven fiber media, preferably a polyester fiber media, that captures and holds spaced polymer particles in place within each cartridge or canister.

In accordance with another embodiment of the methods and coalescing media described herein, the above-described drawbacks of a sump tank system for separation of water from oils and other hydrocarbons have been eliminated by the apparatus and method described herein.

In brief, one aspect of the methods and coalescing media described herein, is to provide a particulate solid polymer that is homogenously dispersed throughout non-woven fibers, preferably polyester fibers, for improved coalescence and separation of hydrocarbons from water. Specifically, the vessel that contains the particulate polymeric solid media that is homogeneously held by fibers includes an inlet, a treated water outlet, and a coalesced hydrocarbon outlet. In the preferred embodiment, a header is disposed inside the vessel near the top or bottom thereof. Preferably, the header is connected to one or more permeable conduits that extend upward therefrom. Polymer particle/non-woven fiber media-containing cartridges can then be stacked on the permeable conduits. A pressure drop between the inlet and the outlet causes the emulsified and or dispersed hydrocarbons in water to flow radially outwardly through the permeable inner tubes of the cartridges, through the media, through the permeable outer covers of the cartridges and into the vessels that house the cartridges. Because intimate contact between the media and liquid results in coalescence of the hydrocarbon droplets, treated water and coalesced hydrocarbon droplets pass through the cartridges and into the vessel, where the floating, coalesced hydrocarbons are easily removed from a top portion of the vessel, and separated water is removed from a bottom portion of the vessel.

Another aspect of the methods, apparatus and non-woven fiber/polymer particle coalescing media described herein is directed toward a method of separating hydrocarbons from a water/hydrocarbon emulsion or stable dispersion including the step of flowing the liquid into a vessel that includes a coalesced hydrocarbon outlet and a water outlet, a header connected to an outlet and at least one permeable conduit connected to the header. The permeable conduit passes through a plurality of coalescing media-containing cartridges. Each cartridge includes a permeable outer cover, a permeable inner tube and contains a coalescing media between the outer cover and inner tube. The method further includes the step of providing a pressure gradient between a portion of the vessel exterior to the cartridges and the inside of the permeable conduit thereby causing the liquid to flow radially outwardly through the inner tube of each cartridge, through the media and through the cartridge outer cover before flowing into the vessel.

Another aspect of the methods, apparatus and non-woven fiber/polymer particle coalescing media described herein is to provide an improved coalescing media canister for separating hydrocarbons from water. The canisters include an outer cylindrical permeable cover, an inner cylindrical permeable tube, a bottom connecting bottom edges of the outer cover to the inner tube, and a top connecting top edges of the outer cover to the inner tube.

Another aspect of the methods, apparatus and non-woven fiber/polymer particle coalescing media described herein is to provide a new and improved method and apparatus for coalescing oil, emulsified in water, for easy separation of the coalesced oil from the water, to achieve complete separation of oil from water admixed on an offshore oil well drilling or oil producing platform so that the separated water can be returned to the ocean without ocean contamination.

Another aspect of the methods, apparatus and non-woven fiber/polymer particle coalescing media described herein is to provide a new and improved method and apparatus for separation of oil from water including a first gravity separation step that provides for separation of water from oil by settling, to provide layering of the water in a layer below an oil layer, and then draining the lower water layer from the upper oil layer, and thereafter directing at least a portion of the separated water layer through a vessel containing an oil coalescing media for coalescing oil droplets that are emulsified in the separated water layer or otherwise are dispersed in the separated water layer such that gravity separation is inadequate for separation of the oil entrained and/or emulsified with the drained water layer.

Another aspect of the methods, apparatus and non-woven fiber/polymer particle coalescing media described herein is to provide a new and improved method and apparatus for separation of organic liquids and water including a first gravity separation step that provides for separation of water and the organic liquids by settling to provide layering of the water in a layer below the organic liquid layer and then draining the lower water layer from the upper organic liquid layer, and thereafter directing the separated water layer through a vessel containing a coalescing media for coalescing the remaining organic liquid droplets entrained with the drained water layer for easy separation therefrom.

Oil, gas and water are commingled when released at high pressure from the oil & gas producing formation. These fluids at high pressure are controlled through chokes and flow lines to flow back to a structure at controlled rates and pressures. Once they enter on to a structure, or platform at sea, they are separated by the differences in density. The fluids enter into two or three phase separators. Separation takes place in cascading pressure separators. The first separation is in a high pressure separator, followed by a medium pressure, then a low pressure separator. A water polishing system, such as that described herein, then is used to separate oil from water, e.g., using organophilic clay, as described in this assignee's patents referred to above. In each separation phase, the lighter gas separates to the top of the vessel, and the liquids separate to the bottom of the vessel. In a three phase separator, the lighter liquid (the oil) separates from the aqueous phase. There are two liquid discharges, the upper discharge is the oil phase and the lower discharge is the water phase. At each subsequent separation phase, the different fluids become higher and higher in purity, with the process and apparatus described herein used as a final separation process and apparatus.

Once the gas phase and the oil phase quality satisfy a marketable standard, they are pumped or compressed into a pipeline that transport these fluids to a processing facility on shore. The water must be de-oiled to the point where it can be discharged into the sea complying with the regulatory discharge standards. After the last two or three phase separator, water enters a polishing system. Polishing systems are a varying configuration of processes to enhance coalescing and oil removal from water. Typical processes consist of coalescing packed CPIs, oil and water separators, hydrocyclones, centrifuges, induced gas flotation, dissolved gas flotation and filtration, e.g., using organophilic clay. The characteristics of the fluids on each facility vary greatly to the point that any one or combination of many of the above processes may be required to ensure compliance for discharge into the sea. The methods, apparatus and non-woven fiber/polymer particle coalescing media described herein can replace any one or all of the above mentioned water polishing processes.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PREFERRED EMBODIMENT

Figure 1:
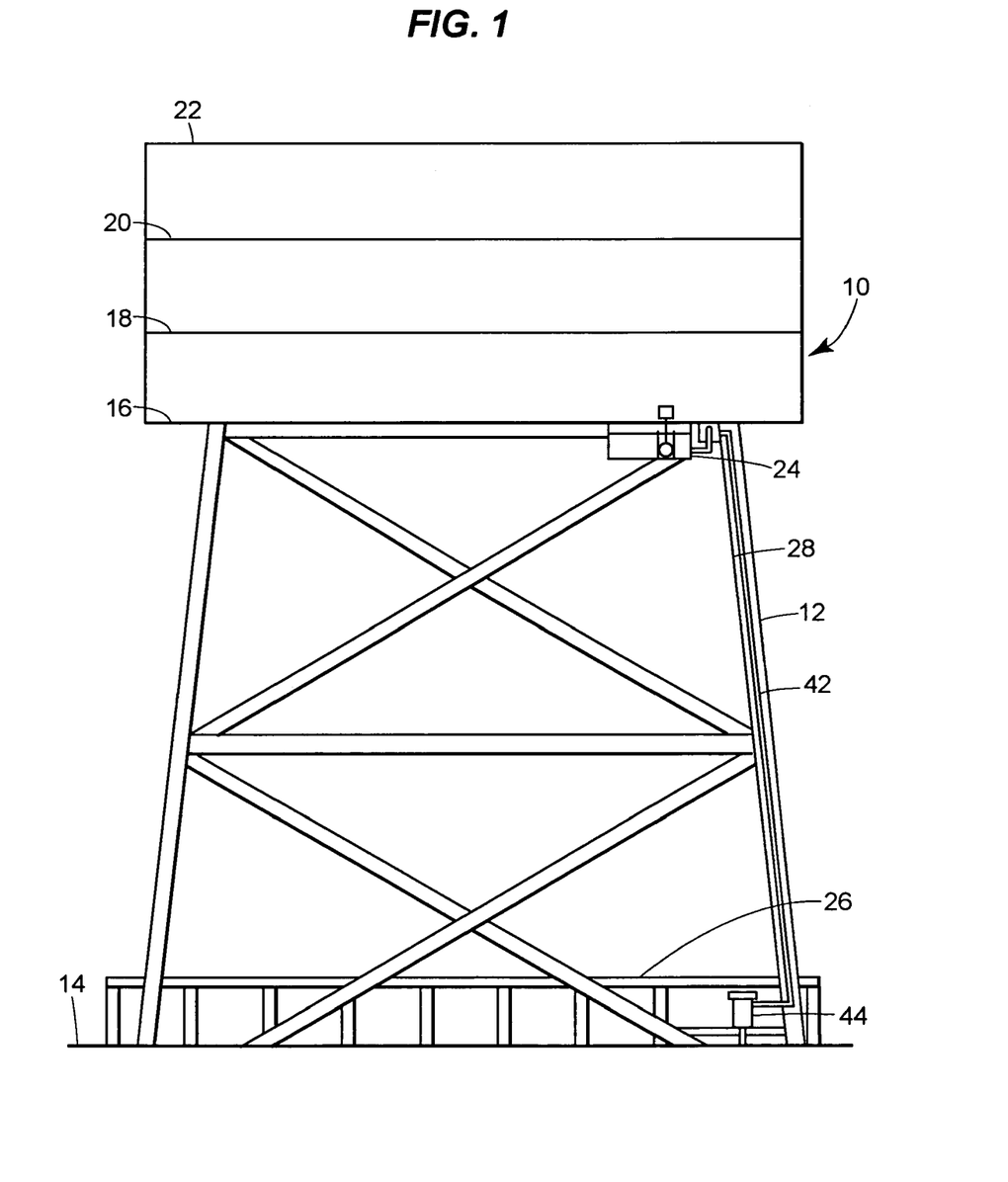
FIG. 1 is a side view of an offshore oil well drilling platform generally showing the oil and water separating apparatus and method of the present invention attached to a platform support structure with an alternative placement of a sump tank.

Turning now to the drawings, and initially to FIG. 1, there is shown an offshore drilling platform generally designated by reference numeral 10 including a work deck support structure 12 for supporting a plurality of stacked work decks at a substantial height above an ocean water level 14. The work decks commonly include a cellar deck 16 at a lowest work deck level, a second deck 18 located directly above the cellar deck 16, a third deck 20 disposed directly above deck 18, and a main deck 22 at an uppermost work deck level. In extant offshore drilling platforms, a sump tank 24 has been connected to the drilling platform 10 at the cellar deck level 16 and rainwater, including entrained hydrocarbons, particularly oil, paraffins and surfactants have been directed from all deck levels, which are contained so that rainwater and entrained hydrocarbons do not spill over to the ocean, to drain by gravity into the sump tank 24. It has been found that further separation of hydrocarbons from rainwater, in addition to gravity separation, is required for effective elimination of ocean water contamination by providing a secondary hydrocarbon recovery apparatus and method for fiber/polymer particle coalescing media treatment of the produced water and/or rainwater separated by gravity in the sump tank 24 or 24A.

In accordance with a preferred embodiment of the methods, apparatus and non-woven fiber/polymer particle coalescing media described herein, it has been found that the apparatus and methods described herein function best when the sump tank 24A is disposed on or near a boat landing deck level 26 (FIG. 1) of the offshore drilling platform 10. However, the sump tank can also be disposed at an upper level, such as at reference numeral 24 in FIG. 1.

Oil and other hydrocarbons collected on the production decks 16, 18, 20 and 22 that may accumulate during dry weather on the inner surfaces of the conduit 28 and inner surfaces of sump tank 24 can be separated from the water that flows from the decks to the coalescing media-containing cartridge 44 for recovery and separation in accordance with the apparatus and methods described herein.

Water and entrained hydrocarbons are conveyed via conduit 28 from the deck areas 16, 18, 20 and 22 along the platform infrastructure or support leg 12 down to the sump tank 24 or 24A, preferably sump tank 24A for convenient servicing and/or coalescing media cartridge replacement. As stated in this assignee's U.S. Pat. Nos. 6,398,951, 6,398,966 and 6,409,924, it is expedient to dispose the water/oil separation apparatus described herein at or near the boat landing deck level 26 (such that at least a portion of the sump tank 24A is within about 10 feet of ocean level) since oil and other hydrocarbons collected on the production decks 16, 18, 20 and 22 that may accumulate during dry weather on the inner surfaces of the conduit 28 and inner surfaces of sump tank 24A can be separated from the water that flows from the decks to the sump tank 24A for recovery and separation in accordance with the apparatus and methods described herein.

Figure 2:
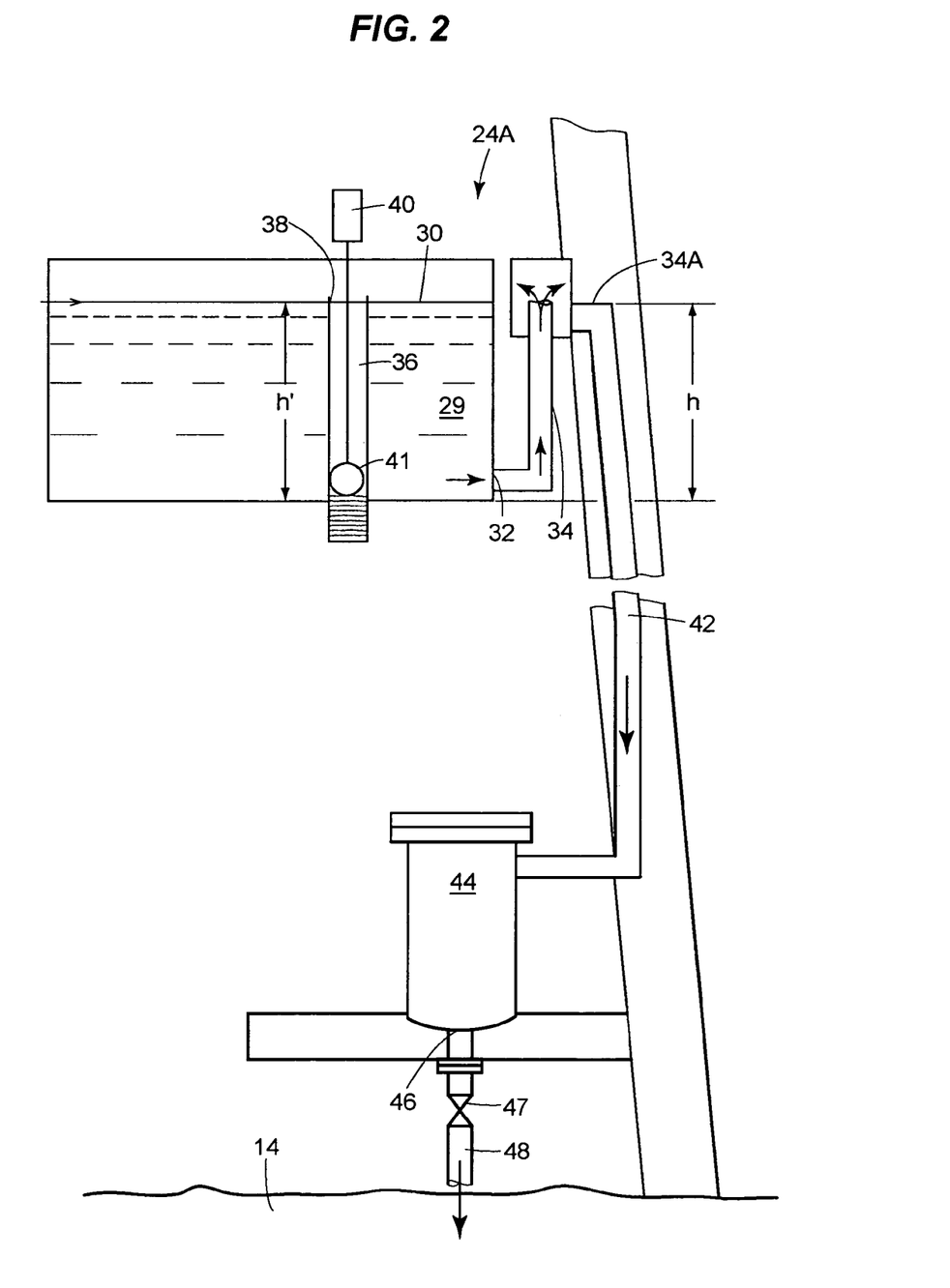
FIG. 2 is a side view of one embodiment of an oil and water separating apparatus and method of the present invention.

Turning now to FIG. 2, there is shown another embodiment of the hydrocarbon coalescing and separating apparatus that includes a gravity separation sump tank 24A for gravity separation of a lower level of water 29 from a floating layer of oil 30. The water 29 is conveyed through a water outlet 32 disposed near a bottom of the sump tank 24A through a water leg 34 in the shape of an inverted U. The water leg 34 achieves gravity flow of water through the water leg 34 only when the level of water within the sump tank 24A reaches height h, above an uppermost or base portion 34A of water leg 34. The sump tank 24A includes an inner, contained float valve housing 36 open at its top 38 for receiving oil from oil level 30 when the level of liquid within the sump tank 24 reaches height h'. Float valve 40 is disposed within inner housing 36 and is connected to a pump (not shown) for pumping oil into an oil recovery vessel when a floating ball portion 41 of float valve 40 rises to a predetermined level within inner valve housing 36 as a result of oil entering inner vessel 36 when the liquid level h' is reached within sump tank 24A. While h and h' are shown to be approximately equal, h may be smaller than h' in order to achieve water removal without oil pumping, as well known in the art.

In accordance with an important feature of the methods, apparatus and non-woven fiber/polymer particle coalescing media described herein, a downwardly extending leg portion 42 of water leg 34 is operatively interconnected to, and in fluid communication with, one or more water and coalesced hydrocarbon collection vessels 44 containing a volume of coalescing media. The separated water flows by gravity through water leg conduit 42 and is conveyed through conduit 42 into water and coalesced hydrocarbon collection vessel 44 containing particulate polymer solids held by random, non-woven fibrous polymer particle capture and spacing material carrying polymer particles—the polymer particles and fibrous capture media hereinafter together called "media" or "coalescing media" and indicated by reference numeral 45. The media-within water and coalesced hydrocarbon collection vessel 44 coalesces the hydrocarbons, oil and other organic materials entrained and/or emulsified with the water flowing through conduits 42 and 44 for essentially complete hydrocarbon removal (less than about 10 parts per million, preferably less than about 1 part per million organics after flowing through the particulate polymer solids held by random, non-woven fibrous material, as a coalescing media treatment, and separating the organics from the water by gravity). The treated water and coalesced hydrocarbons flow through the liquid-permeable covers 76 of in the cartridges 55 into the vessel 44. The treated water then flows by gravity through water exit opening 46 in the water and coalesced hydrocarbon collection vessel 44 and through exit conduit 48 back to the ocean water 14.

It will be noted that FIG. 2 is a simplified drawing of an actual apparatus which, preferably, would include a plurality of vessels 44 connected downstream of one or more sock filters (not shown) for separation of larger oil droplets. The vessels 44 may also be connected upstream of one or more activated charcoal filters (not shown) or other suitable filter as a final polishing step before the water is returned to the ocean. Such sock filters and activated charcoal or carbon filters are well known to those skilled in the art.

Figure 3:
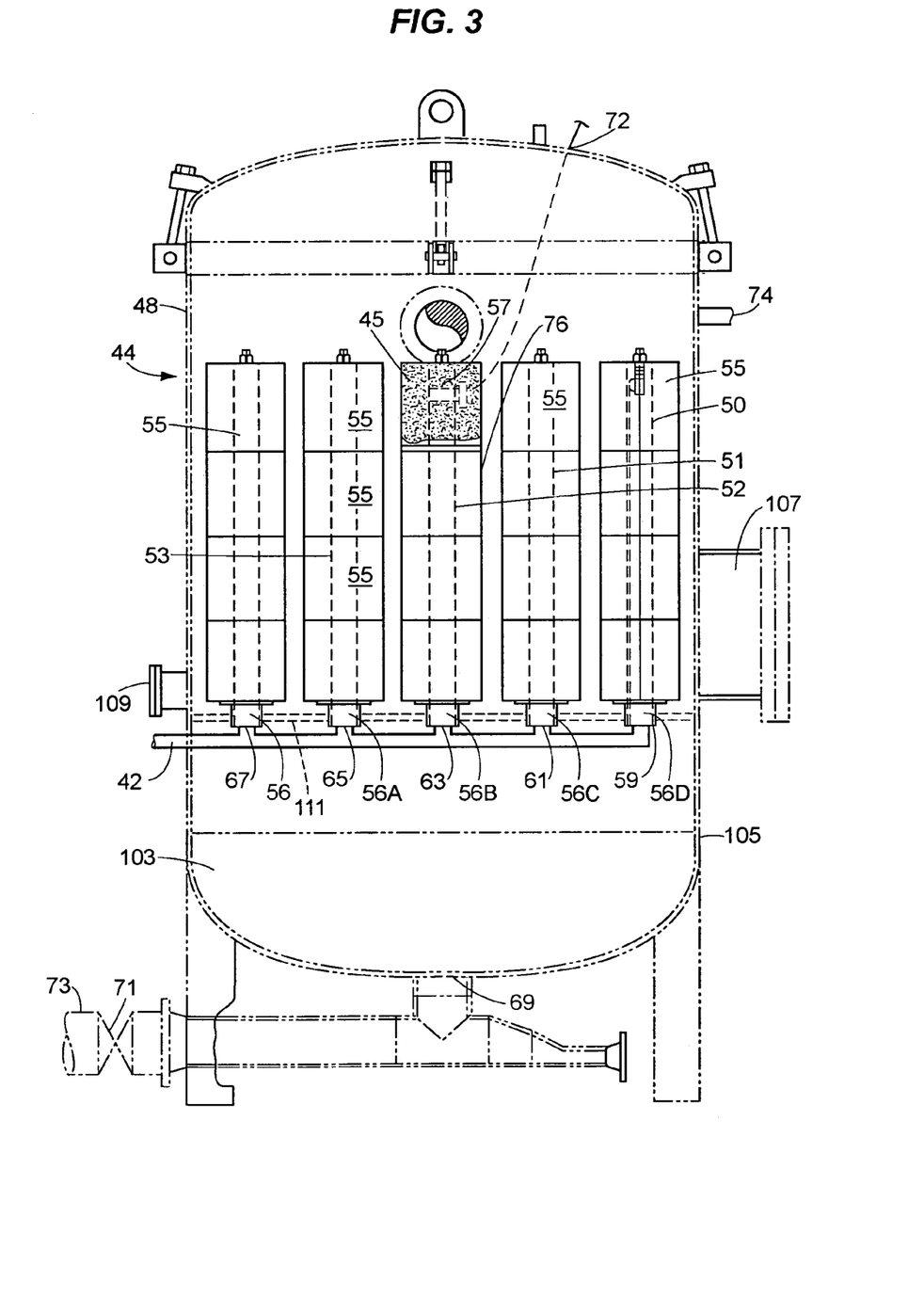
FIG. 3 is a sectional view of an embodiment of a vessel containing a plurality of polymer particle/fiber media-containing cartridges for efficient coalescing of hydrocarbon-droplets contained in water.
Figure 6:
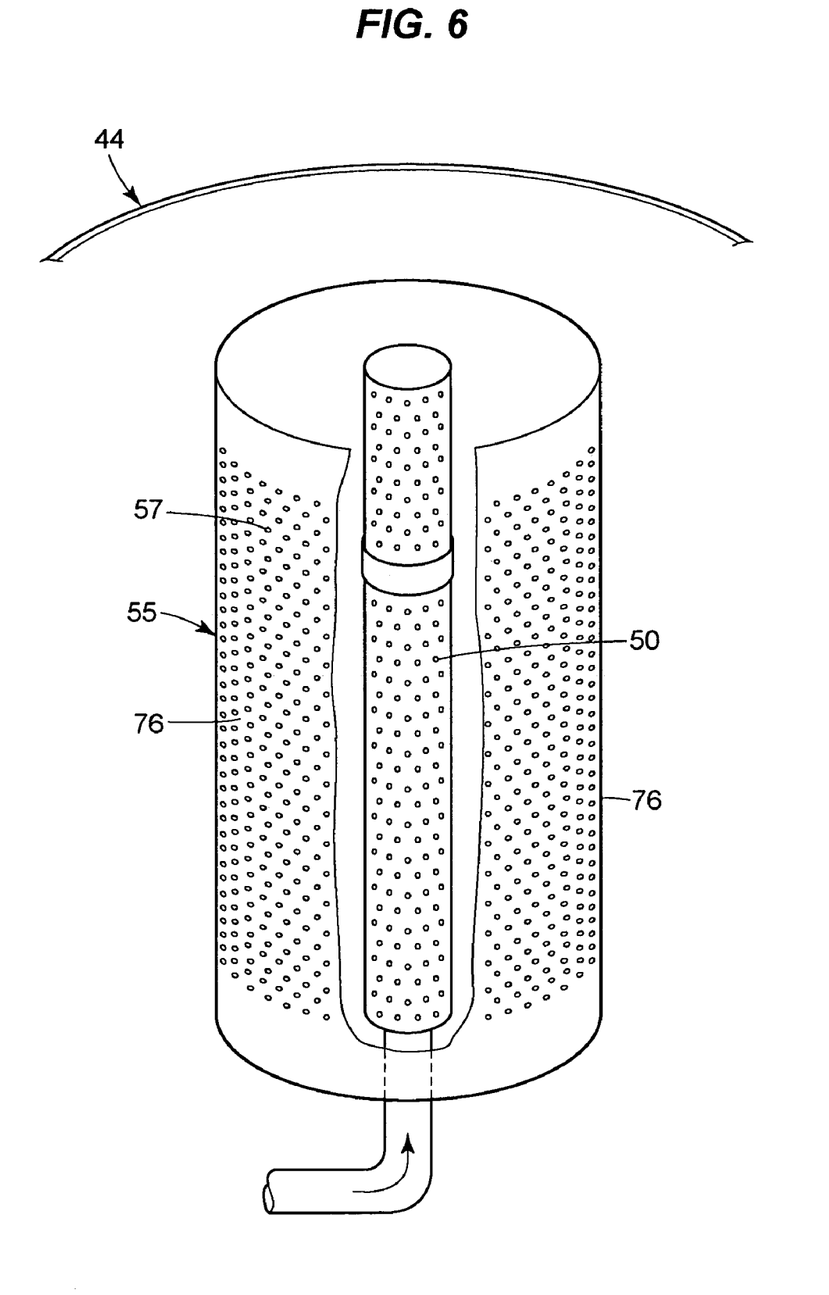
FIG. 6 is a partially broken-away side view of an embodiment of a water and coalesced hydrocarbon collection vessel, containing multiple, stacked cartridges (FIGS. 3 and 4)

As shown in FIGS. 3 and 6, the water and coalesced hydrocarbon collection vessel 44 includes an outer, fluid-impermeable housing 48 having a water inlet 42 interconnected through the housing 48 so that contaminated water enters the water and coalesced hydrocarbon collection vessel 44 and then enters the coalescing media-containing vessels or cartridges 55, through a plurality of longitudinal, axial, central inlet conduits 56, 56A, 56B, 56C and 56D that may form part of a header, described in more detail hereinafter. The coalescing media-containing cartridges 55 are water-permeable by virtue of the water and coalesced hydrocarbon flow apertures 57, in the cartridge cover 76, that are sized sufficiently small such that polymer particles from the coalescing media do not pass therethrough. Water entering the water and coalesced hydrocarbon collection vessel 44 through water inlet conduit 42 and cartridge inlet conduits 56, 56A, 56B, 56C and 56D flows radially outwardly through the polymer particle/non-woven fiber coalescing media 45 where the emulsified and/or dispersed hydrocarbons coalesce into larger droplets. The coalesced hydrocarbons and water flow through the openings 57 in each liquid permeable cartridge cover 76 and collect in vessel 44 where the coalesced hydrocarbons float on the water for easy separation. The clean water exits the vessel 44 through exit conduit 69 and through valve 71 and then is returned to the ocean 14 via outlet 73. The coalesced hydrocarbons are recovered from hydrocarbon exit conduit 74 located in a top portion of vessel 44.

Figure 4:
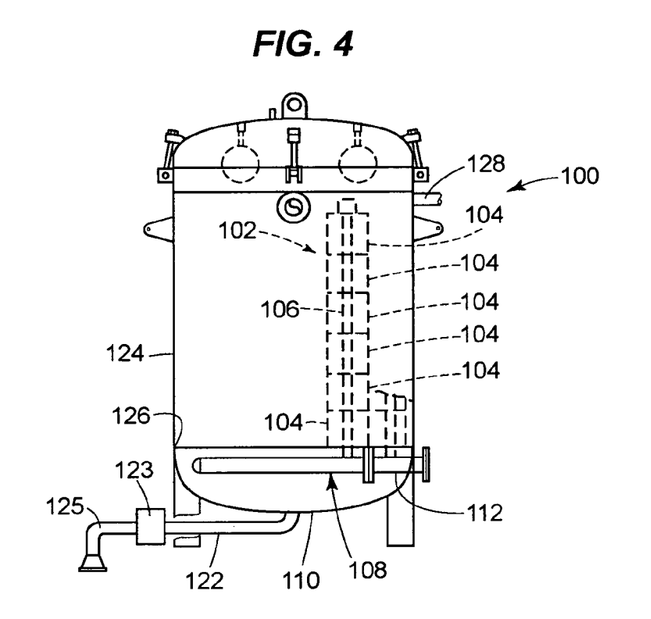
FIG. 4 is an elevational view of a preferred embodiment of a vessel containing a plurality of polymer particle/fiber media-containing cartridges.

Turning to FIG. 4, another embodiment of a vessel 100 is shown containing stacks of cartridges, one of which is shown at 102. Each cartridge stack includes a plurality of annular cartridges 104 through which a porous contaminated liquid inlet conduit 106 extends. The porous inlet conduit 106 is connected to a header 108 which is disposed within a bottom section 110 of the vessel 100, similar to the contaminated water inlet conduits 56, 56A, 56B, 56C and 56D shown in FIG. 3.

Figure 5:
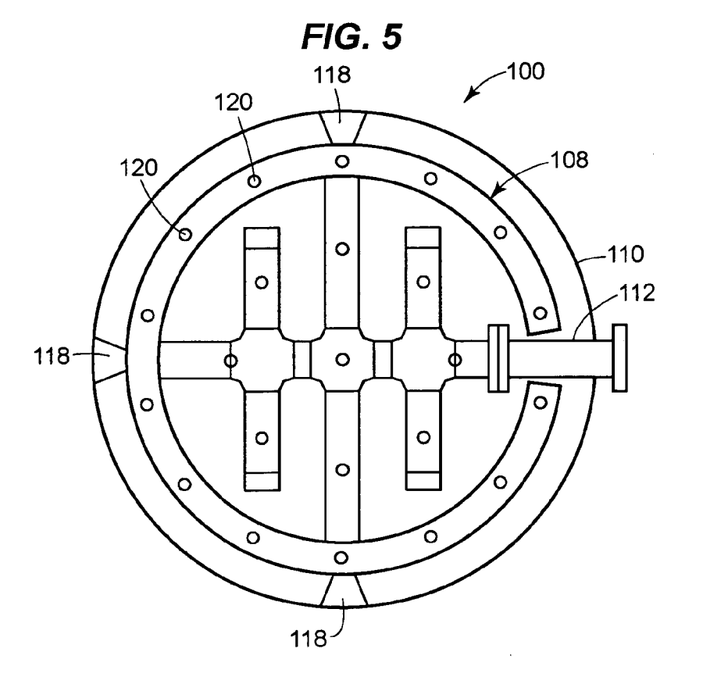
FIG. 5 is a top plan view of the header of the vessel shown in FIG. 4 and openings within the header for receiving permeable conduits each of which can extend through a stack of filter cartridges as shown in FIGS. 3 and 4.

Turning to FIG. 5, the header 108 is connected to a contaminated water inlet 112 which includes a flange 114 which is connected to the flange 116 of the header 108 by a plurality of fasteners, such as bolts (not shown). The header is also supported within the bottom structure 110 (see FIG. 4) of the vessel by a plurality of supports shown at 118. The header 108 includes a plurality of openings 120, each of which receives a permeable conduit 106 (see FIG. 4). In the embodiment illustrated in FIGS. 4 and 5, the header 108 is connected to 23 permeable conduits and therefore supports 23 stacks 102 of cartridges 104. By providing the header 108 within the bottom structure 110 of the vessel 100, a permeable tube sheet 111 shown in FIG. 3 is not needed for collecting solids and the bottom section 110 of the vessel can be used to collect accumulated solids, or solids which do not pass through the outer covers 76 of the filter cartridges 104. A drain 122 is provided for purposes of flushing out the accumulated solids which settle in the bottom structure 110 of the vessel 100, together with the clean water. The clean water can be passed through a solids filter 123 before being directed to the ocean through conduit 125. In contrast, as shown in FIG. 3, solids will accumulate on top of the tube sheet 111. Thus, the solids must be removed from above the tube sheet 108 using one or more nozzle openings shown at 109 in FIG. 3. As shown in FIG. 4, these additional nozzle openings are not required in the vessel 100 because the accumulated solids are easily flushed down the drain pipe 122 into solids filter 123. Coalesced hydrocarbons are removed from the vessel 100 through hydrocarbon exit conduit 128.

Figure 7:
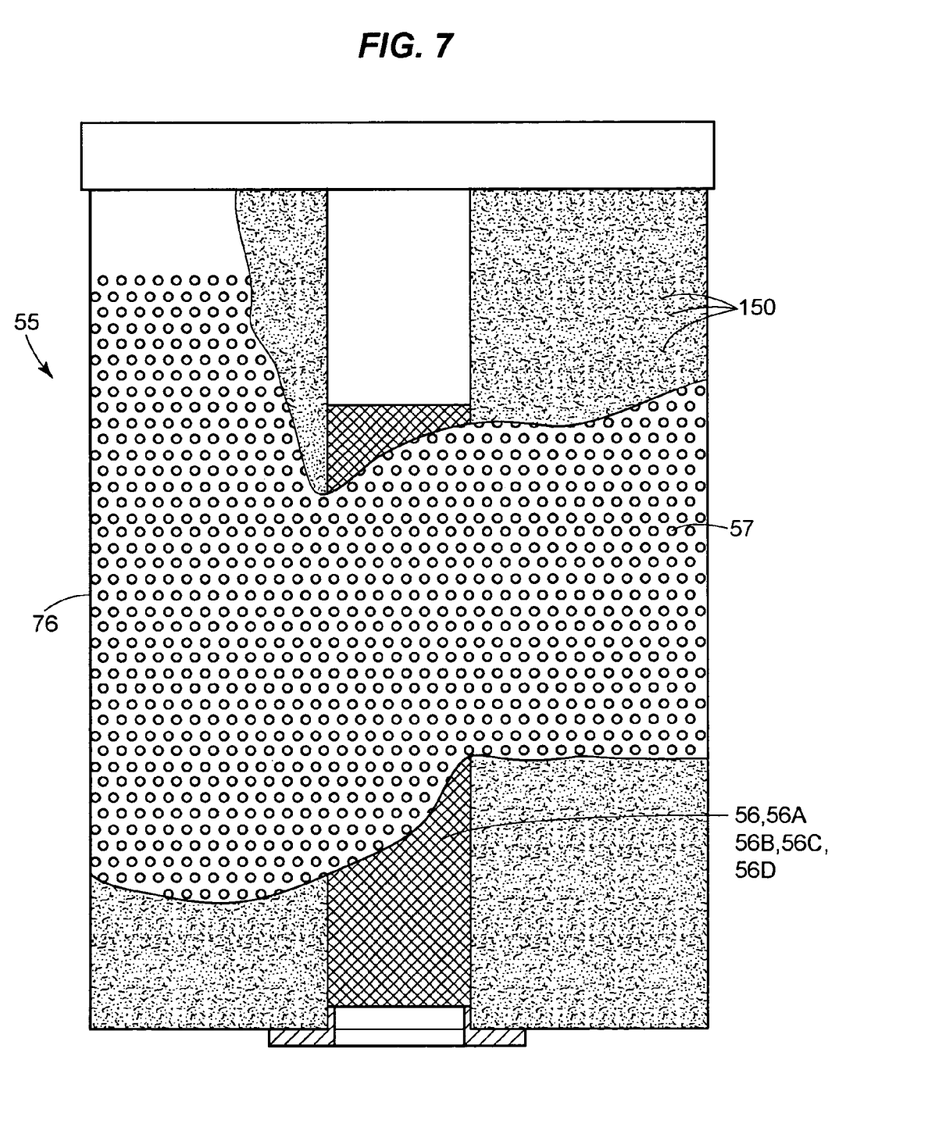
FIG. 7 is an elevational view of a preferred embodiment of a non-woven fiber/polymer particle coalescing media-containing cartridge shown in FIGS. 3 and 4.

As shown in FIG. 5, an extremely dense number of stacks of cartridges 104 is provided by the header 108. Specifically, the header 108, as shown in FIG. 5, includes 23 openings 120, and therefore 23 porous conduits 106 and therefore 23 stacks 102 of cartridges 104. Accordingly, the volumetric flow rate that can be handled by the vessel 100 is substantially greater than the volumetric flow rate that can be handled by the vessel 44. Of course, smaller vessels with fewer stacks of cartridges and large vessels with more stacks of cartridges are anticipated FIG. 7 illustrates a single cartridge 55 containing the polymer particle/non-woven fiber coalescing media 45 that is loosely packed within the canister 55 between liquid-permeable contaminated water inlet tube (56, 56A, 56B, 56C and 56D of FIG. 3) and an outer, liquid-permeable cartridge cover 76. As shown, the polymer particle/non-woven fiber coalescing media 45 comprises a low density mass of non-woven fibers, e.g., polyester fibers 150 having a density of about 0.05 g/cc to about 0.25 g/cc that is sprinkled with polymer particles having a particle size in the range of about 0.045 mm to about 1.5 mm. The fibers should carry at least about 0.05 grams of polymer per cubic centimeter of fiber volume, preferably about 0.1 to about 0.4 gm, more preferably about 0.1 to about 0.3 gm of polymer particles per cc of fiber volume (measured by volume of the cylinder that the coalescing media occupied), in order to achieve sufficient hydrocarbon coalescence.

The preferred particulate polymers are commercial foamed polyisocyanurates obtained from Apache Iso Systems known as WHITE-LINE and PYROX. A preferred polyurethane is a polyurethane spray-on foam identified as GREAT STUFF™ polyurethane foam sealant from Dow Chemical. Another useful polyurethane foam is 1,3-propanediol, 2-ethyl-2-(hydroxymethyl)-, polymer with 1,3-diisocyanatomethylbenzene (CAS# 9017-09-8), having the formula $(C_9H_6N_2O_2.C_6H_{14}O_3)_x$ wherein x=about 10 to about 1000 (molecular weight between about 10,000 and about 1,000,000).

The polymer particles are sprinkled into the staple polyester fibers and the fibers are shaken, for example, on a vibratory screen to disperse the polymer particles throughout the fibers. No adhesive or other means is needed to securing the polymer particles to the fibers since the intermingled fibers hold the polymer particles in place by contact with multiple fiber edges.

Other useful polyurethanes that may be chopped or pulverized for use as the polymer particles carried by the fiber media include the reaction product of any of the following aliphatic or aromatic diisocyanates with one or more of the following dialcohols and cross-linking agents, wherein the cross-linking agent is used in an amount that results in a foam or semi-rigid polyurethane but not a rigid polyurethane:

| diisocyanate | polyols |
|---|---|
| 1,2-ethylene diisocyanate; | ethylene glycol |
| 1,6-hexylene diisocyanate; | propylene glycol |
| lysine diisocyanate; | trimethylolpropane |
| bis(2-isocyanatoethyl)fumarate; | trimethylolethane |
| 1,4-cyclohexylene diisocyanate; | 1,2-propanediol |
| methylcyclohexylene diisocyanate; | 1,4-butanediol |

-continued

| diisocyanate | polyols |
|---|---|
| 2,2,4-trimethyl-1,6-hexylene diisocyanate; | diethylene glycol |
| 2,6-tolylene diisocyanate; | polyoxypropylene triols |
| 4,4'-diisocyanatodiphenyl ether; | dihydroxy polyethers |
| 4,4'-diisocyanatodiphenylmethane; | trihydroxy polyethers |
| 3,3'-dichloro-4,4'- | poly (tetramethylene glycol) |
| diisocyanatodiphenylmethane; | poly (ethylene glycol) |
| 4,4'-diphenyl diisocyanate; | poly (propylene glycol) |
| 4,4'-diisocyanatodiphenyl; | pentaerythritol |
| 3,3'-dimethyl-4,4'- | poly (caprolactone diol) |
| diisocyanatodiphenyl; | polyether/polyester |
| 2,2'-dimethyl-4,4'- | polyo/hybrids |
| diisocyanatodiphenyl; | polyester diols extended with propylene oxide; |
| 3,3'-dimethoxy-4,4'- | polyether triols |
| diisocyanatodiphenyl; | cross-linking agents |
| 2,2'-dichloro-5,5'-dimethoxy-4,4'-diisocyanatodiphenyl; | ethylene diamine, |
| 3,3'-dichloro-4,4'- | diethylene, triamine, |
| diisocyanatodiphenyl; | n-methyl ethylene diamine, |
| 1,3-diisocyanatobenzene; | trimethylpropane, |
| 1,4-diisocyanatobenzene; | trimethylolethane, |
| 1,2-naphthylene diisocyanate; | glyceraol, |
| 4-chloro-1,2-naphthylene diisocyanate; | 1,2,6-hexane triol, cyclopentane-tetracarboxylic acid, 1,3,5-benzene tricarboxylic acid, |
| 4-methyl-1,2-naphthylene diisocyanate; | citric acid, trimethylolpropane tris(β-mercaptopropionate) and |
| 1,3-naphthylene diisocyanate; | pentaerythritol tetrakis(β- |
| 1,4-naphthylene diisocyanate; | mercaptopropionate, |
| 1,5-naphthylene diisocyanate; | triethylenetetramine, |
| 1,6-naphthylene diisocyanate; | tetraethylenepentamine, |
| 1,7-naphthylene diisocyanate; | polyethyleneimine, |
| 1,8-naphthylene diisocyanate; | pentaerythritol, |
| 4-chloro-1,8-naphthylene diisocyanate; | tolylene-2,4,6-triamine, amino-ethanol, |
| 2,3-naphthylene diisocyanate; | trimethylenediamine, |
| 2,7-naphthylene diisocyanate; | tetramethylenediamine, |
| 1,8-dinitro-2,7-naphthylene diisocyanate; | pentamethylenediamine, hexamethylenediamine, |
| 1-methyl-2,4-naphthylene diisocyanate; | ethanolamine, diethanolamine, |
| 1-methyl-5,7-naphthylene diisocyanate; | hydrazine, triethanolamine, |
| 6-methyl-1,3-naphthylene diisocyanate | benzene-1,2,4-tricarboxylic acid, nitrilotriacetic acid |
| and 7-methyl-1,3-naphthylene diisocyanate. | 4,4'-methylenebis(o-chloroaniline) |
| p-phenylene diisocyanate; | |
| toluene diisocyanate; | |
| 4,4'-methylenebis-(phenylisocyanate); | |
| polymethylene polyphenyl isocyanate; | |
| bitolylene diisocyanate; | |
| m-tetramethyl-xylylene; | |
| hexamethylene diisocyanate; | |
| 1,6-diisocyanato-2,2,4,4-tetra-methylhexane; | |
| 1,6-diisocyanato-2,4,4-trimethyl-hexane; | |
| trans-cyclohexane-1,4-diisocyanate; | |
| 1,3-bis(isocyanato-methyl)cyclohexane; | |
| 3-isocyanato-methyl-3,5,5-trimethylcyclo-hexyl isocyanate; | |
| dicyclohexylmethane diisocyanate | |

Other polymers that function as the particulate polymer of the coalescing media 45 include polyvinyl polymers, such as polyethylene and polypropylene and copolymers thereof; polyesters, such as polyethylene terephthalate; polystyrene, and the like. The particulate polymer should have a density of at least about 0.01 g/ml to 2 g/ml, preferably about 0.03 g/ml to about 1.3 g/ml, more preferably about 0.05 g/ml to about 1.1 g/ml.

The flow rate of contaminated water can be much faster using the coalescing media described herein than when organophilic clay fills the cartridges, as described in this assignee's prior patents. The flow rate of contaminated water should be such that the contaminated water has a contact time, within each cylinder of about 1 second to about 5 minutes. The total contact time, of course, can be varied by varying the number of canisters provided for contaminated water contact.

The preferred fibers used to carry the polyurethane polymer particles is a polyester, e.g., polyethylene terephthalate, staple fibers having a continuous length, or a mixture of polyester fibers having a single length or different lengths. The width of the staple fibers is not critical, but the best width for support and homogeneous spreading and spacing of polymer particles throughout the fibers is in the range of about 0.1 mm to about 10.0 mm, particularly 1 to 20 denier, preferably about 2 to 10 denier.

The fibers that carry the absorbent polymer particles can be any fibers, particularly the non-absorbent polymeric fibers, such as polyester fibers, such as polyethylene terephthalate; nylon fibers, such as poly(hexamethylene adipamide); polyethylene or poly propylene homopolymers or any copolymer thereof; cellulose triacetate fibers; acrylic fibers, such as polyacrylonitrile, polyacrylate, and polymethacrylate fibers; p-aramid fibers, and the like. The fibers should be flexible and preferably have a narrow thickness of about 1 denier to about 10 denier so that the fibers can capture and hold the polymer particles in place within the canisters as an evenly loaded polymer particle-carrying fiber media.

The oil coalescing ability of the coalescing media 45 was tested using polyethylene terephthalate fibers of 5-6 denier carrying polyurethane foam particles having a size in the range of 0.045 mm to 1.50 mm and a bulk density of 0.074 g/cc. The weight ratio of polyurethane foam particles to fiber was 1.2 grams of polyurethane particles to 1 gram of polyester. Each canister had a volume between the centrally disposed, liquid-permeable conduit, and the outer, liquid-permeable cover of 550 in$^3$, carrying 550 gm of polyethylene terephthalate (polyester) fibers and 660 gms of polyurethane particles. The oil-contaminated water flowed in series through two collection vessels, each containing 18 in each vessel (72 canisters total). Vessels 1 and 4 were connected in series; and vessels 2 and 3 were connected in series. The contaminated water was first sent through a sock filter constructed of 3 layers of propylene, a first layer having openings having a size of 25 μm, the second layer having openings sized 10 μm, and a third layer having openings sized 5 μm for initial removal of large oil droplets that did not require coalescing for separation from the water. The contaminated water exiting the sock filter then was conveyed through vessels 1 and 4 (see data of Table 1) or through vessels 2 and 3 (see data of Table 2). The following data of Tables 1 and 2 show removal of oil from the contaminated water to a level well below a level below the EPA requirement of below 29 ppm allowed for return to the ocean:

TABLE 1

VESSELS 1 AND 4 IN SERIES

| TIME | | PPM Oil Into Sock | PPM Oil Out of Sock and Into Vessel 1 | PPM Oil Out of Vessel 1 and Into Vessel 4 | PPM Oil out of Vessel 4 |
|---|---|---|---|---|---|
| Day 1 | 9:30 | 208 | 44 | 14 | 7 |
|  | 12:30 | 174 | 114 | 14 | 7 |
|  | 18:30 | 157 | 65 | 14 | 7 |
| Day 2 | 7:00 | 182 | 59 | 57 | 7 |
|  | 12:00 | 178 | 124 | 57 | 7 |
|  | 19:00 | 183 | 86 | 57 | 7 |
| Day 3 | 7:00 | 167 | 124 | 25 | 14 |
|  | 9:00 | 185 | 118 | 25 | 14 |
|  | 17:00 | 175 | 105 | 25 | 14 |
| Day 4 | 6:30 | 166 | 95 | 28 | 12 |
|  | 12:00 | 180 | 98 | 28 | 12 |
| AVERAGE | | 178 PPM | 94 PPM | 31 PPM | 10 PPM |

TABLE 2

VESSELS 2 AND 3 IN SERIES

| Time | | PPM Oil Into Sock | PPM Oil Out of Sock and Into Vessel 2 | PPM Oil Out of Vessel 2 and Into Vessel 3 | PPM Oil Out of Vessel 3 |
|---|---|---|---|---|---|
| Day 1 | 9:30 | 208 | 44 | 17 | 5 |
|  | 12:30 | 174 | 114 | 17 | 5 |
|  | 18:30 | 157 | 65 | 17 | 5 |
| Day 2 | 7:00 | 182 | 59 | 51 | 3 |
|  | 12:00 | 178 | 124 | 51 | 3 |
|  | 19:00 | 183 | 86 | 51 | 3 |
| Day 3 | 7:00 | 167 | 124 | 20 | 2 |
|  | 9:00 | 185 | 118 | 20 | 2 |
|  | 17:00 | 175 | 105 | 20 | 2 |
| Day 4 | 6:30 | 166 | 95 | 22 | 4 |
|  | 12:00 | 180 | 98 | 22 | 4 |
| AVERAGE | | 178 PPM | 94 PPM | 27.5 PPM | 3.5 PPM |

Additional polyurethane materials were also tested. The following data in Tables 3-7 detail the materials tested, the tests performed, and the coalescing results achieved. Several polyurethane materials, shown in Table 3, were either obtained from commercial sources or synthesized in the laboratory.

TABLE 3

| Commercial Name | Manufacturer | Contact Information | Identity on Label | Traditional Use |
|---|---|---|---|---|
| White-Line | Apache Iso Systems | Apache Iso Products 107 Service Road, Anderson, S.C. 29625 | Polyisocyanurate | Roof or wall insulation |
| Pyrox | Apache Iso Systems | Apache Iso Products 107 Service Road, Anderson, S.C. 29625 | Polyisocyanurate | Roof or wall insulation |
| H-Shield | Hunter | Hunterpanels.com | Polyisocyanurate | Building Insulation |
| Recycle Carpet Pad | Unknown | Unknown | Polyurethane | Carpet Pad |
| Pillow Foam | Unknown, pillow was purchased at Target | Unknown for manufacturer | Polyurethane | Pillow |
| Great Stuff* | Dow Chemical Company | 1881 West Oak Parkway, Marietta, Georgia 30062 | Polyurethane intermediate which is made from polymeric diisocyanate, polyols, and hydrocarbon gas mixture | Insulating foam sealant |
| Touch-N-Foam* | Convenience Products | Fenton, Mo 63026 | Contains MDI monomer, polyurethane resin, and propane/isobutane | Insulating foam sealant |

*The Great Stuff and Touch-N-Foam polyurethane materials were sprayed onto wax paper and allowed to cure. It was observed that the bead expanded significantly for about 2 hours. The expanded foam was allowed to air dry for 18 hours and then milled.

The polyurethane materials were milled to obtain smaller particles sizes. The particle size distributions are shown in Table 4:

TABLE 4

| Sieve size, mesh | Sieve size, mm | White-Line | Pyrox | H-Shield | Recycle Carpet Pad | Pillow Foam | Great Stuff | Touch N Foam |
|---|---|---|---|---|---|---|---|---|
| 10 | 2.00 | 0 | 0 | 0 | 0 | 0 | 0 | 0 |
| 16 | 1.18 | 0 | 0 | 0 | 0 | 0 | 0 | 0 |
| 18 | 1.00 | 1.7 | 1.3 | 2.6 | 3.1 | 1.6 | 0.9 | 0.7 |
| 30 | 0.6 | 8.5 | 7.5 | 6.9 | 7.3 | 9.7 | 9.6 | 9.1 |
| 40 | 0.425 | 15.2 | 16.3 | 14.3 | 15.7 | 15.9 | 14.6 | 13.9 |
| 50 | 0.30 | 40.3 | 38.5 | 42.5 | 41.9 | 42.4 | 41.5 | 42.8 |
| 70 | 0.212 | 13.6 | 13.7 | 14.7 | 15.2 | 13.2 | 12.4 | 14.7 |
| 100 | 0.150 | 8.6 | 7.9 | 6.5 | 6.9 | 7.8 | 7.4 | 8.3 |
| 200 | 0.074 | 8.3 | 6.9 | 8.3 | 9.4 | 7.9 | 9.7 | 9.1 |
| 325 | 0.045 | 3.8 | 7.9 | 4.2 | 0.5 | 1.5 | 3.9 | 1.4 |

A roll of polyester fabric was obtained from Foss Manufacturing Company. A 1 ft wide×1 ft long×0.5 in thick (144 in$^2$ or 930 cm$^2$) (72 in$^3$ or 1160 cm$^3$) piece weighed 9.1. The milled polyurethane particles were poured on top of the polyester fiber and the assembly shaken sideways in order to vibrate the polymer particles down into the open area of the fiber. The procedure was repeated until the polymer particles would not continue to penetrate the polyester fiber. This loading would be considered the maximum polymer particle loading in this particular polyester fabric, as shown in Table 5:

TABLE 5

| Commercial Name Polyurethane | Manufacturer | Amount of Polymer Particles that Were Loaded into Polyester Fabric (g polymer particles/g fiber) | Amount of Polymer Particles that Were Loaded into 12 in$^2$ Polyester Fabric (g polymer particles/12 in$^2$ fiber) |
|---|---|---|---|
| White-Line | Apache Iso Systems | 1.42 | 12.78 |
| Pyrox | Apache Iso Systems | 1.73 | 15.60 |
| H-Shield | Hunter | 1.75 | 15.75 |
| Recycle Carpet Pad | Unknown | 0.84 | 7.56 |
| Pillow Foam | Unknown, pillow was purchased at Target | 0.76 | 6.84 |
| Great Stuff | Dow Chemical Company | 1.24 | 10.8 |
| Touch-N-Foam | Convenience Products | 1.27 | 11.43 |

The polymer particle-embedded polyester fiber was packed into a 4 inch long×1 inch diameter glass column. The column was aligned horizontally with the polymer-embedded fibers packed tightly inside the column, as shown in Table 6:

TABLE 6

| Commercial Name Polyurethane | Manufacturer | Amount of Polymer Embedded Fabric Loaded into the 4" long column (g) | Calculated Amount of polymer particles loaded into the column (g) | Calculated amount of fabric loaded into the columns (g) |
|---|---|---|---|---|
| White-Line | Apache Iso Systems | 5.08 | 2.98 | 2.10 |
| Pyrox | Apache Iso Systems | 5.65 | 3.58 | 2.07 |
| H-Shield | Hunter | 5.85 | 3.72 | 2.13 |
| Recycle Carpet Pad | Unknown | 3.99 | 1.82 | 2.17 |
| Pillow Foam | Unknown, pillow was purchased at Target | 3.87 | 1.67 | 2.20 |
| Great Stuff | Dow Chemical Company | 4.79 | 2.65 | 2.14 |
| Touch-N-Foam | Convenience Products | 4.72 | 2.64 | 2.08 |

Separately, in a glass beaker, 500 ppm of 10W30 motor oil was continuously stirred in order to form as small of oil droplets and as a maximum oil concentration of an oil-in-water emulsion as possible. The oily water solution was pumped through the horizontal column at a 30 second retention time rate. During the pumping of the oily water, the upper portion of the horizontal column was observed for buildup of coalesced oil. In addition, oil & grease measurements were obtained on the column influent and effluent. The data are shown in Table 7:

TABLE 7

| Commercial Name Polyurethane | Manufacturer | Average Influent Oil & Grease Concentration as Determined by EPA Method 1664 (ppm) | Average Effluent Oil & Grease Concentration as Determined by EPA Method 1664 (ppm) | Average Oil & Grease Removal Percentage (%) inside column |
|---|---|---|---|---|
| No media-empty column | NA | 440 | 385 | 12.5 |
| Polyester fabric only-no polymer particles | Foss Manufacturing | 419 | 232 | 44.6 |
| White-Line in Polyester Fabric | Apache Iso Systems | 468 | 12 | 97.5 |
| Pyrox in Polyester fabric | Apache Iso Systems | 412 | 9 | 97.8 |
| H-Shield in Polyester fabric | Hunter | 398 | 7 | 98.3 |
| Recycle Carpet Pad in Polyester fabric | Unknown | 437 | 173 | 60.4 |
| Pillow Foam in Polyester fabric | Unknown, pillow was purchased at Target | 471 | 93 | 80.3 |
| Great Stuff in Polyester fabric | Dow Chemical Company | 456 | 16 | 96.5 |
| Touch-N-Foam in Polyester fabric | Convenience Products | 437 | 11 | 97.5 |
| White-Line-no Polyester Fabric | Apache Iso Systems | 473 | Flow slowed down as polymer started to pack. Oil coated all polymer particles | |
| Pyrox- no Polyester fabric | Apache Iso Systems | 462 | Flow slowed down as polymer started to pack. Oil coated all polymer particles | |
| H-Shield-no Polyester fabric | Hunter | 429 | Flow slowed down as polymer started to pack. Oil coated all polymer particles | |
| Recycle Carpet Pad-no Polyester fabric | Unknown | 437 | No flow as particles packed tightly and terminated flow | |
| Pillow Foam-no Polyester fabric | Unknown, pillow was purchased at Target | 481 | No flow as particles packed tightly and terminated flow | |
| Great Stuff-no Polyester fabric | Dow Chemical Company | 468 | Flow slowed down as polymer started to pack. Oil coated all polymer particles | |
| Touch-N-Foam-no Polyester fabric | Convenience Products | 445 | Flow slowed down as polymer started to pack. Oil coated all polymer particles | |

CONCLUSIONS

1. Polymer particles alone do not work as they become excessively coated in oil and pack too tightly which significantly restricts flow.

2. Polymer dispersed in polyester fabric coalesces oil and provides very good removal rates.

3. Polyester fabric alone does not have surface area for good oil removal.

What is claimed is:

1. A method of separating water from a liquid comprising a combination of water and a dispersed or emulsified liquid hydrocarbon contaminant comprising:

flowing the liquid into a liquid permeable conduit disposed within a collection vessel, said liquid-permeable conduit disposed within a cartridge containing fibers that carry liquid-absorbent particulate polymer particles capable of coalescing the hydrocarbon contaminant when said liquid flows radially outwardly through said fibers carrying said particulate polymer particles, and through a liquid-permeable cartridge cover, for collection in said vessel;

flowing the liquid radially outwardly through the liquid-permeable cartridge cover, whereby water and coalesced hydrocarbons flow into said collection vessel;

collecting the water and coalesced hydrocarbons in said collection vessel, removing the water from a lower portion of the collection vessel; and removing the coalesced liquid hydrocarbons from an upper portion of the collection vessel.

2. The method of claim 1 wherein the vessel contains a plurality of said cartridges.

3. The method of claim 2, wherein the vessel comprises a plurality of said liquid-permeable conduits extending within the vessel, each of the conduits being connected to a stack of cartridges.

4. The method of claim 3, wherein each liquid-permeable conduit is connected to a header, the conduits extending upward from the header and within the housing, each conduit passing through at least one of said cartridges.

5. The method of claim 1, wherein said liquid that comprises a combination of water and a dispersed or emulsified liquid hydrocarbon contaminant is obtained by:

collecting, in a settling vessel, a composition comprising water, a hydrocarbon liquid, and a hydrocarbon liquid dispersed or emulsified in water and allowing the composition to settle to form a lower layer comprising water, a hydrocarbon liquid dispersed or emulsified in water, and an upper hydrocarbon layer; and draining a portion of the water layer from the settling vessel, prior to flowing the water and the dispersed or emulsified hydrocarbon contaminant into the collection vessel.

6. The method of claim 1, wherein the fibers carrying the particulate polymer particles comprise polyester fibers.

7. The method of claim 6, wherein the fibers comprise polyethylene terephthalate fibers.

8. The method of claim 1, wherein the particulate polymer has a particle size of about 1.5 mm to about 0.045 mm.

9. The method of claim 1, wherein the fibers within the canisters have a width in the range of about 1 to about 10 denier.

10. The method of claim 1, wherein the fibers are packed within the canisters to have a density of about 0.05 g/cc to about 0.25 g/cc.

11. The method of claim 10, wherein the polymer particles carried by said fibers are present in an amount of about 0.05 g/cc to about 0.4 g/cc, based on the volume filled by the carrying fibers.

12. The method of claim 11, wherein the polymer is a polyurethane or a polyisocyanurate.

* * * * *